(12) United States Patent
Miyata et al.

(10) Patent No.: US 6,522,129 B2
(45) Date of Patent: *Feb. 18, 2003

(54) INDUCTION TYPE TRANSDUCER AND ELECTRONIC CALIPER

(75) Inventors: Toshiharu Miyata, Kawasaki (JP); Nobuyuki Hayashi, Kawasaki (JP); Kouji Sasaki, Kawasaki (JP); Tetsuro Kiriyama, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,913

(22) Filed: Mar. 13, 2001

(65) Prior Publication Data

US 2002/0011838 A1 Jan. 31, 2002

(30) Foreign Application Priority Data

Mar. 13, 2000 (JP) .......................... 2000-068703

(51) Int. Cl.[7] .............. G01B 7/02; G01B 7/14
(52) U.S. Cl. ............... 324/207.17; 324/207.16; 324/207.24; 336/84 M
(58) Field of Search .............. 324/207.17, 207.24, 324/207.16, 207.12, 225, 212; 33/810, 819, 820, 784; 336/84 M (56) References Cited

U.S. PATENT DOCUMENTS

| | | | | | |
|---|---|---|---|---|---|
| 3,934,335 | A | * | 1/1976 | Nelson | 29/847 |
| 4,229,883 | A | * | 10/1980 | Kobashi | 33/784 |
| 4,843,506 | A | * | 6/1989 | Gill et al. | 360/319 |
| 5,136,125 | A | * | 8/1992 | Russell | 178/18.07 |
| 5,761,009 | A | * | 6/1998 | Hughbanks et al. | 360/113 |
| 5,815,091 | A | * | 9/1998 | Dames et al. | 324/207.17 |
| 5,901,458 | A | | 5/1999 | Andermo et al. | 324/207.17 |
| 5,973,494 | A | * | 10/1999 | Masreliez et al. | 324/207.24 |
| 6,249,234 | B1 | * | 6/2001 | Ely et al. | 341/20 |
| 6,332,278 | B1 | * | 12/2001 | Bezinge et al. | 33/784 |
| 2001/0024123 | A1 | * | 9/2001 | Shiraishi et al. | 324/332 |

* cited by examiner

*Primary Examiner*—Edward Lefkowitz
*Assistant Examiner*—Danell Kinder
(74) *Attorney, Agent, or Firm*—Oliff & Berridge, PLC (57) ABSTRACT

An induction type tranducer is formed to be a substrate having a multilayer structure. The substrate has a multilayer structure including six layers, a first layer through sixth layer. An exciting coil is formed at the first layer. Detecting coils are formed at the second layer and the third layer. A wiring layer is formed at the fifth layer at the opposite side of the scale from the core layer. A signal processing IC is formed at the sixth layer. A magnetic shield layer, which insulates magnetic flux from the exciting coil, is formed at the fourth layer between the exciting coil and the signal processing IC.

20 Claims, 6 Drawing Sheets

INDUCTION TYPE TRANSDUCER AND ELECTRONIC CALIPER

BACKGROUND OF THE INVENTION

1. Field of the Invention

The present invention relates to an induction type transducer and an electronic caliper, and in particular, a small-sized induction type transducer with high detection performance and an electronic caliper using the same transducer.

2. Description of the Related Art

Measuring equipments such as an electronic caliper have been widely used for measurement of the thickness or other physical dimensions of objects in the manufacturing industry. As the main component of an electronic caliper, a transducer has been used.

Among various transducers, a capacitance type transducer and an induction type transducer are generally known. In, the capacitance type transducer, a transmitting electrode and a receiving electrode are provided on a grid (slider), and a signal electrode is provided on a scale opposed to the grid. The transmitting electrode and the receiving electrode on the grid are capacitively coupled with the signal electrode on the scale. A drive signal is supplied to the transmitting electrode, and a detection signal which is generated at the receiving electrode in accordance with the relative positions of the grid and scale is processed by a processing circuit, whereby the movement or position of the grid with respect to the scale is detected.

Such a capacitance type transducer is suitable for use in a relatively clean and dry environment such as an inspection room or a design office, however, it cannot be used for dimensional measurement in an environment where the degree of pollution is relatively high such as a machine shop. In the case where a particulate substance such as metal particles and grinding powder or a fluid such as a cooling or cutting fluid exists, the particulate substance or the fluid enters between the signal electrode on the scale and the signal electrode or receiving electrode on the grid, and changes the capacitance between the signal electrode and the transmitting electrode or receiving electrode, resulting in detection failure.

On the other hand, in an induction type transducer, the relative positions of the grid and scale are detected based on the electromagnetic induction between them, so that this transducer has an advantage in that it can be used for dimensional measurement in an environment with a relatively high degree of pollution.

Figures 6A, 6B:
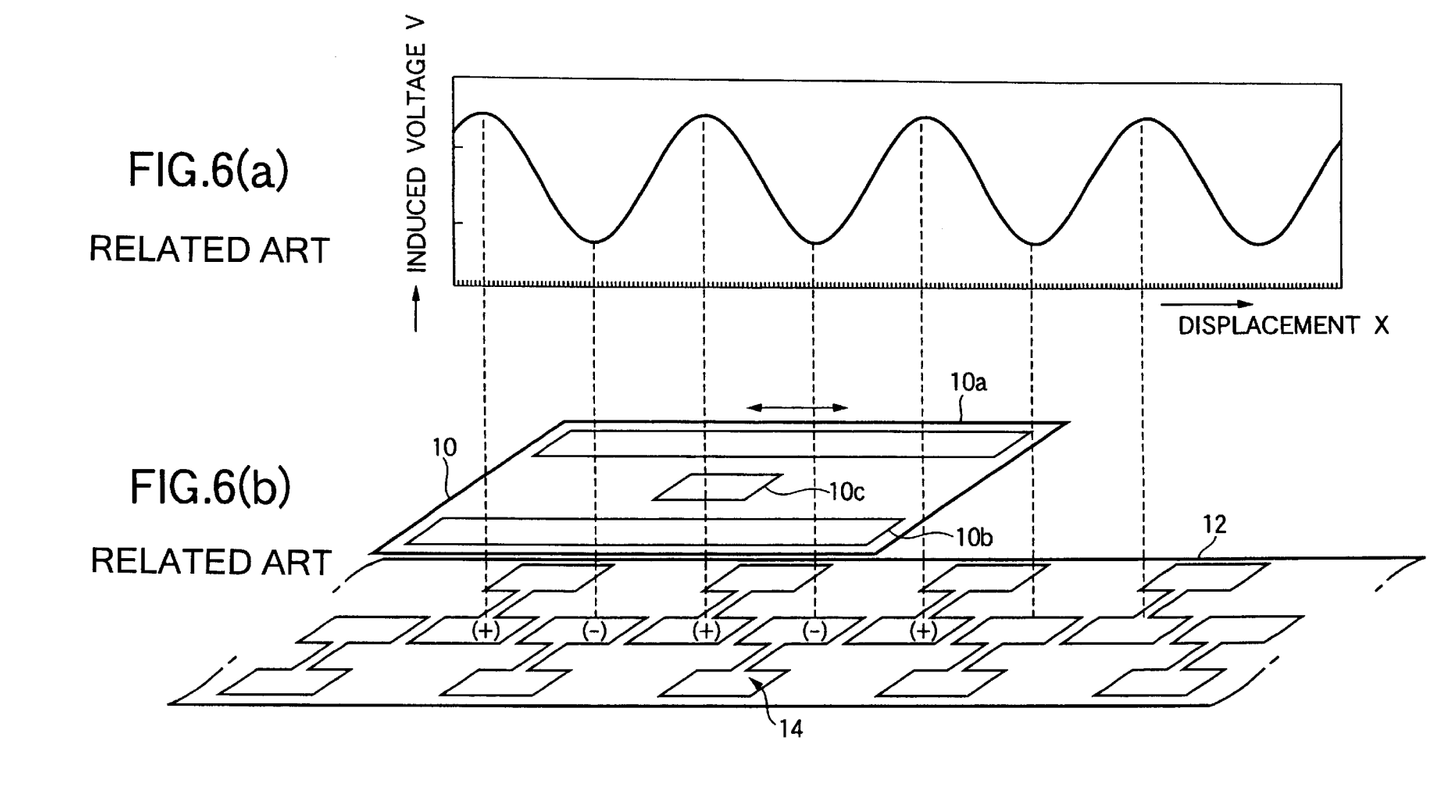
FIG. 6 is a principle explanatory view of the induction type transducer.

FIG. 6 shows the principle of measurement of the induction type transducer. As shown in (b) of FIG. 6, a grid (slider) 10 and a scale 12 are disposed so as to be opposite to each other. The grid 10 is provided with exciting coils 10$a$ and 10$b$, and a detecting coil 10$c$. The detecting coil 10$c$ is disposed between the exciting coils 10$a$ and 10$b$. On the other hand, a scale coil 14 is formed on the scale 12, a magnetic flux is generated when supplying a current to the exciting coils 10$a$ and 10$b$, and an induced current flows in the scale coil 14 on the scale 12 due to electromagnetic induction. Then, a magnetic flux is generated by the induced current in the scale coil 14, and by this magnetic flux, an induced current (induced voltage) is generated in the detecting coil 10$c$ on the grid 10. Since the induced current (induced voltage) changes in accordance with the relative positions of the exciting coils 10$a$ and 10$b$ and scale coil 14, if the grid 10 is moved in the direction of the arrow in the figure with respect to the scale 12, as shown in (a) of FIG. 6, a periodic induced voltage V is generated in the detecting coil 10$c$. Therefore, by detecting the value of the induced voltage, the relative positions of the grid 10 and the scale 12 can be detected.

Even if a pollutant such as water or oil is mixed between the grid 10 and scale 12, the magnetic flux and the magnetic non-permeability do not change and influence the induced voltage, so that the relative positions can be detected with high accuracy even in an environment with a high degree of pollution.

Figure 7A:
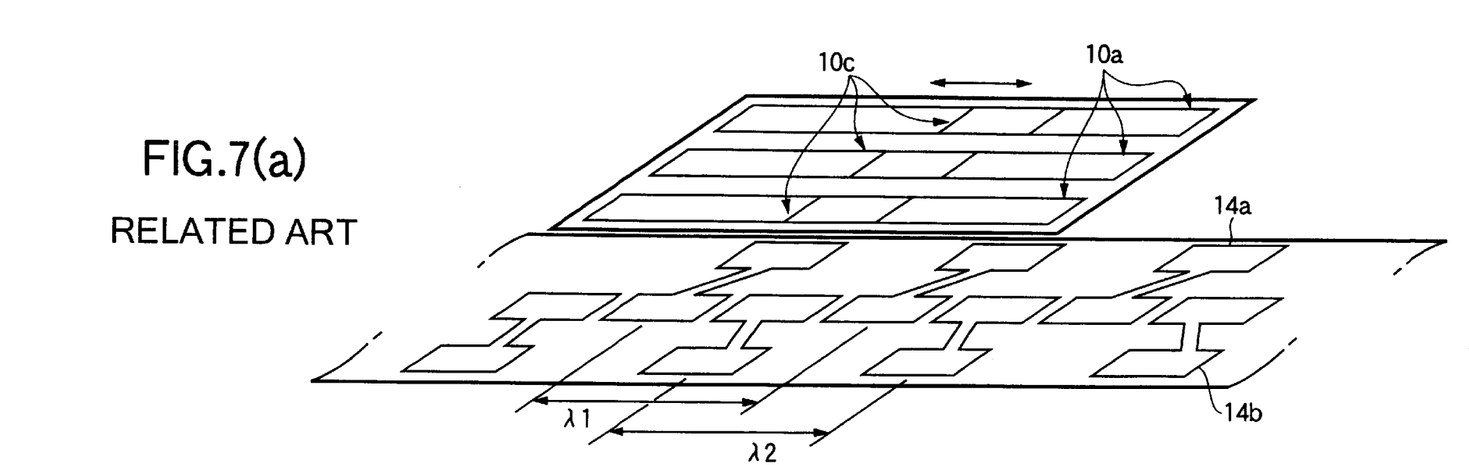
FIG. 7 is a principle explanatory view of the induction type transducer.
Figure 7B:
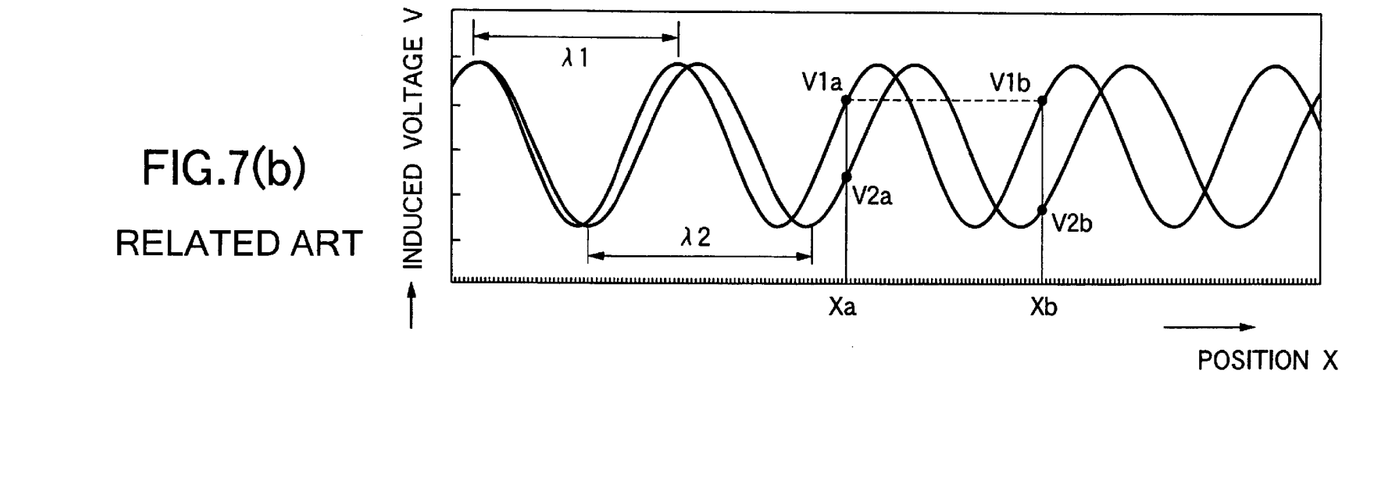

On the other hand, FIG. 7 shows a principle for detection of the absolute displaced positions of the grid 10 and scale 12 by using the abovementioned principle. Herein, the absolute displaced positions mean the amounts of displacement from a certain reference point (zero point). As shown in (a) of FIG. 7, a plurality of exciting coils 10$a$ are provided on the grid 10, and a plurality of detecting coils 10$c$ are provided in accordance with these exciting coils. Scale coils 14$a$ and 14$b$, whose center portions have a pitch of $\lambda 1$, and end portions have a pitch of $\lambda 2$ are formed on the scale 12. The pitch at the center portion and the pitch at the end portion are different from each other, so that two induced voltages of the pitches of $\lambda 1$ and $\lambda 2$ are also generated in the detecting coils 10$c$ formed at the center portion and the end portion on the grid 10. Since one cycle of the two signals differs from each other, the relationship in the induced voltage between two wavelengths at a specified induced voltage value will not become the same at all the grid positions with respect to the scale 12. That is, as shown in (b) of FIG. 7, at the positions X$a$ and X$b$ at which the induced voltage values V1$a$ of the pitch $\lambda 1$ are the same, the induced voltage values of the pitch $\lambda 2$ are not identical to each other. Therefore, by converting the relationship in the induced voltage between the two wavelengths into the positions, the absolute position of the grid can be detected.

Thus, the induction type transducer can measure dimensions with high accuracy even in an environment with a relatively high degree of pollution, however, it is necessary that a plurality of exciting coils and detecting coils are formed on the grid, and in particular, when the transducer detects an absolute position, the structure of the grid becomes complicated, and the transducer increases in size. Furthermore, when such an induction type transducer is built-in an electronic caliper, an increase in size of the transducer leads-in an increase in size of the electronic caliper itself, and lowering of workability when measuring.

SUMMARY OF THE INVENTION

The invention is made in view of the abovementioned problems in the related art, and the object thereof is to provide a small-sized induction type transducer with high performance, and furthermore, an electronic caliper using such a small-sized magnetic type transducer with high performance.

In order to achieve the abovementioned object, an induction type transducer of the invention, which outputs an electric signal in accordance with relative displacement between two members, comprises a magnetic flux generating section for generating a magnetic flux based on a drive signal, a magnetic flux detecting section for detecting a magnetic flux which changes in accordance with the relative positions, and a signal processing section for processing a detection signal from the magnetic flux detecting section. In the induction type transducer, the magnetic flux generating section, magnetic flux detecting section, and signal processing section form, a multilayer structure. The magnetic flux generating section, magnetic flux detecting section, and signal processing section are not disposed in parallel on the same plane, but are formed on respective layers in the multilayer structure, whereby the transducer can be reduced in size.

Herein, the multilayer structure is preferably a structure in which a plurality of layers are built-up on a core layer. The use of the built-up substrate reduces the size, thickness, and weight. Furthermore, the number of layers in the multilayer structure becomes easily properly adjustable.

Furthermore, the magnetic flux generating section is formed at the measuring plane side and the signal processing section is formed at the opposite side of the measuring plane. Herein, the measuring plane side means the side opposed to the scale. By forming the magnetic flux generating section at the measuring plane side, a generated magnetic flux can be made to effectively influence the measuring side. Also, by forming the signal processing section at the opposite side of the measuring plane, the influence of an unnecessary magnetic flux on the signal processing section and a mixture of electromagnetic noise can be prevented.

Furthermore, it is preferable that the magnetic flux generating section and the magnetic flux detecting section are formed at the measuring plane side, and the signal processing section is formed at the opposite side of the measuring plane. The abovementioned effect can be obtained even when the magnetic flux detecting section is formed within the same plane as with the magnetic flux generating section.

Furthermore, it is preferable that the magnetic flux generating section is formed at a position closer to the measuring plane than the magnetic flux detecting section and the signal processing section in the multilayer structure, and the magnetic flux detecting section is formed at a position closer to the measuring plane than the signal processing section in the multilayer structure. Thereby, a magnetic flux generated from the magnetic flux generating section tan be made to effectively influence the measuring plane side, and an induced magnetic field is effectively detected by the magnetic flux detecting section and the signal processing section is separated from the magnetic coupling range, whereby the mixture of unnecessary electromagnetic noise can be prevented. The magnetic flux detecting section may be formed at a position closer to the measuring plane than the magnetic flux generating section and the signal processing section in the multilayer structure, and the magnetic flux generating section may be formed at a position closer to the measuring plane than the signal processing section in the multilayer structure.

Furthermore, it is preferable that at least one magnetic shield section is formed between the magnetic flux generating section and the signal processing section in the multilayer structure. In a case where the magnetic flux generating section and the signal processing section are formed at respective layers of the multilayer structure, since both sections become close in distance to each other, a magnetic flux generated by the magnetic flux generating section may directly influence the signal processing section, and signals other than an original detection signal may mix into the signal processing section due to, the change in the magnetic flux. Therefore, by providing a magnetic shield section, the mixture of such electronic noise can be suppressed and the detection accuracy can be improved. The magnetic shield section is preferably formed at one layer of the multilayer structure, and a single magnetic shield section or a plurality of magnetic shield section may be provided at different layers. The magnetic shield section can be formed from at least any of nonmetals with high magnetic permeability represented by ferrite, metals with low magnetic permeability represented by copper, and metals with high magnetic permeability represented by permalloy. When the magnetic shield section is formed from metal, in order to prevent deterioration in the signal strength due to capacitive coupling between the magnetic flux generating section and the magnetic flux detecting section, it is preferable that the magnetic shield section is maintained at a constant voltage, for example, a voltage at ground level.

When the magnetic shield section is formed from metal, the magnetic shield section is preferably formed so as to be separated from the magnetic flux generating section or magnetic flux detecting section by a distance equivalent to or longer than the gap between the two members. The magnetic shield section functions as a shielding means for suppressing the influence of a magnetic flux from the magnetic flux generating section on the signal processing section. However, if the magnetic shield section is formed from metal with low magnetic permeability such as copper, which is easily acquired, an induced current (eddy current) is generated in the magnetic shield section due to the magnetic flux from the magnetic flux generating section, and this eddy current tends to cancel the magnetic flux, so that the signal strength deteriorates. Therefore, in the case where the magnetic shield section is formed so as to be separate by a predetermined distance from the magnetic flux generating section or the magnetic flux detecting section it the magnetic flux generating section is formed at the same layer as that of the magnetic flux detecting section, the deterioration in signal strength can be suppressed and the detection accuracy can be improved. It is desirable that the distance between the magnetic flux generating section or magnetic flux detecting section and the magnetic shield section is determined in accordance with the distance between the two members, more specifically, the gap (air gap) between the magnetic flux generating section and other member in terms of detection accuracy. Even when the magnetic flux density in the measuring plane lowers due to the eddy current generated in the magnetic shield section, if the gap is sufficiently small, the detection signal strength is maintained. By separating the magnetic shield section from the magnetic flux generating section or magnetic flux detecting section by a distance equivalent to or longer than the gap, attenuation of the detection signal strength can be suppressed. If the magnetic shield section is excessively separated, the thickness of the multilayer structure increases accordingly, so that this is not suitable for practical use.

When the magnetic shield section is formed from nonmetal, it is preferable that the magnetic shield section is formed at a close distance from the magnetic flux generating section or magnetic flux detecting section that is equivalent to or shorter than the gap between the two members. When a nonmetal with high magnetic permeability such as ferrite is used for the magnetic shield section, the magnetic flux density is not reduced so much by an eddy current, and the magnetic shield section is disposed to be close to the abovementioned member and the magnetic flux density can be increased due to its high magnetic permeability.

The abovementioned induction type transducer can be applied to, for example, an electronic caliper, whereby the electronic caliper can be reduced in size and improved in performance.

In the electronic caliper, the induction type transducer can be built-in at the grid (slider) side, however, the gap between the grid and scale is preferably set to be approximately one tenth of the pitch of the detection signal. If the gap is too large, the amount of magnetic flux reaching the scale decreases, and if the gap is too small, the influence of the form of the coils at the scale side increases and the detection signal is greatly distorted. Therefore, there is an optimum size of the gap whereby the amount of reduction in magnetic flux reaching the scale is made small (by reducing the gap size to some degree), and the distortion in the detection signal is made small (by increasing the gap size to some degree), and concretely the size of gap of approximately one tenth of the pitch (or wavelength) of the detection signal is optimum in terms of the magnetic flux and signal distortion. Thereby, the detection accuracy can be further improved.

DETAILED DESCRIPTION OF THE PREFERRED EMBODIMENTS

Hereinafter, an embodiment of the invention is explained with reference to the drawings.

Figure 1:
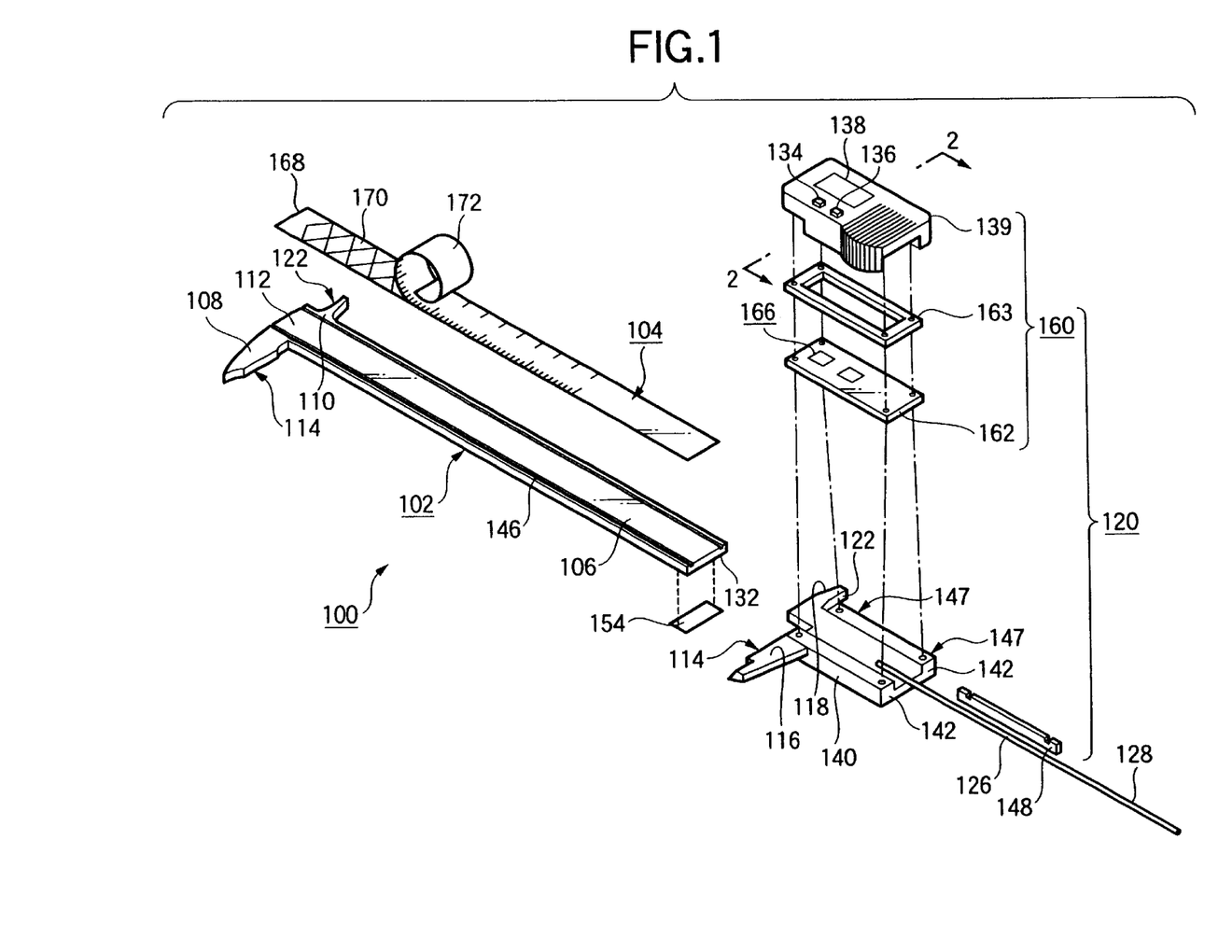
FIG. 1 is a constructional view of the electronic caliper of the embodiment.

FIG. 1 shows the structure of the electronic caliper of the embodiment in which the induction type transducer is installed. Electronic caliper 100 is constructed so as to include a thin and long beam 102 and a grid (slider) assembly 120. The thin and long beam 102 is a rigid or semi-rigid bar or plate member having an almost rectangular parallelepiped section. A groove 106 is formed at the upper surface of the thin and long beam 102. A measuring scale 104 is fixed within the groove 106 of the thin and long beam 102. The groove 106 is formed so as to have a depth which is almost equal to the thickness of the scale 104, so that the upper surface of the scale 104 comes to almost the same plane as with the upper surface of the beam 102.

A pair of fixed contactors 108 and 110, which project horizontally, are formed near the end part 112 of the beam 102. A pair of movable contactors 116 and 118, which project horizontally, are formed in the grid assembly 120. The outside dimensions of an object are measured upon placing the object between a pair of engaging surfaces 114 of the contactors 108 and 116, and the inside dimensions of an object are measured upon placing the contactors 110 and 118 in the object. The engaging surfaces 122 of the contactors 110 and 118 are contacted with the surface of the object to be measured.

The engaging surfaces 122 and 114 are disposed so that the engaging surfaces 122 of the contactors 110 and 118 are aligned with each other when the engaging surfaces 114 of the contactors 108 and 116 come into contact with each other. This aligned position becomes the zero reference position when measuring absolute positions.

The electronic caliper 100 may also include a depth bar 126 to be attached to the grid assembly 120. The depth bar 126 projects lengthwise from the beam 102 and ends at the engaging end part 128. The length of the depth bar 126 is set so that the engaging end part 128 comes to the same plane as with the end part 132 of the beam 102 when the caliper 100 is at the zero position mentioned above. In a condition where the end part 132 of the beam 102 is placed on an object having a hole made in the surface, the depth bar 126 is extended until its end part 128 comes into contact with the bottom of the hole, whereby the depth of the hole can be measured with the caliper 100. Of course, this depth bar 126 may not be provided.

In all cases where the outside contactors 108 and 116 are used, the inside contactors 110 and 118 are used, and the depth bar 126 is used, the measured dimensions are displayed on the digital display 138 attached inside the cover 139 of the caliper 100. A pair of push buttons 134 and 136 are attached to the cover 139. The push button 134 is a button for turning signal processing IC 166 of the grid assembly 120 on and off, and the push button 136 is a button for resetting the display 138 to zero.

The grid assembly 120 is constructed so as to include a base part 140 provided with guide edges 142. The guide edges 142 come into contact with the side edges 146 of the thin and long beam 102 when the grid assembly 120 is laid across the thin and long beam 102. Thereby, the caliper 100 can be accurately operated. A pair of screws 147 urge pressure bar 148 through a restituting force toward the edge part, with which the beam is engaged, to eliminate the "plays" between the assembly 120 and the thin and long beam 102.

Furthermore, the grid assembly 120 includes detection assembly 160 attached to the base part 140 above the thin and long beam 102. The base part 140 and detection assembly 160 move with respect to the scale in a united manner. The detection assembly 160 includes substrate 162 that is described later, and the substrate 162 has a multilayer structure in which an exciting coil, detecting coils, and a signal processing IC are multilayered. Thus, the substrate 162 of the detection assembly 160 has a multilayer structure, whereby reduction in size of the detection assembly 160 and reduction in size of the grid assembly 120 become possible. A sealing tool 163 with restituting force is pushed-in between the cover 139 and substrate 162, whereby contamination of the signal processing IC 166 can be prevented.

On the other hand, the scale 104 is constructed so as to include a thin and long printed circuit board 168. A scale coil 170 is formed on the printed circuit board 168. The scale coil 170 is formed from, for example, copper. The scale coil 170 is covered by a coating layer 172, and the coating layer 172 is graduated.

Figure 2:
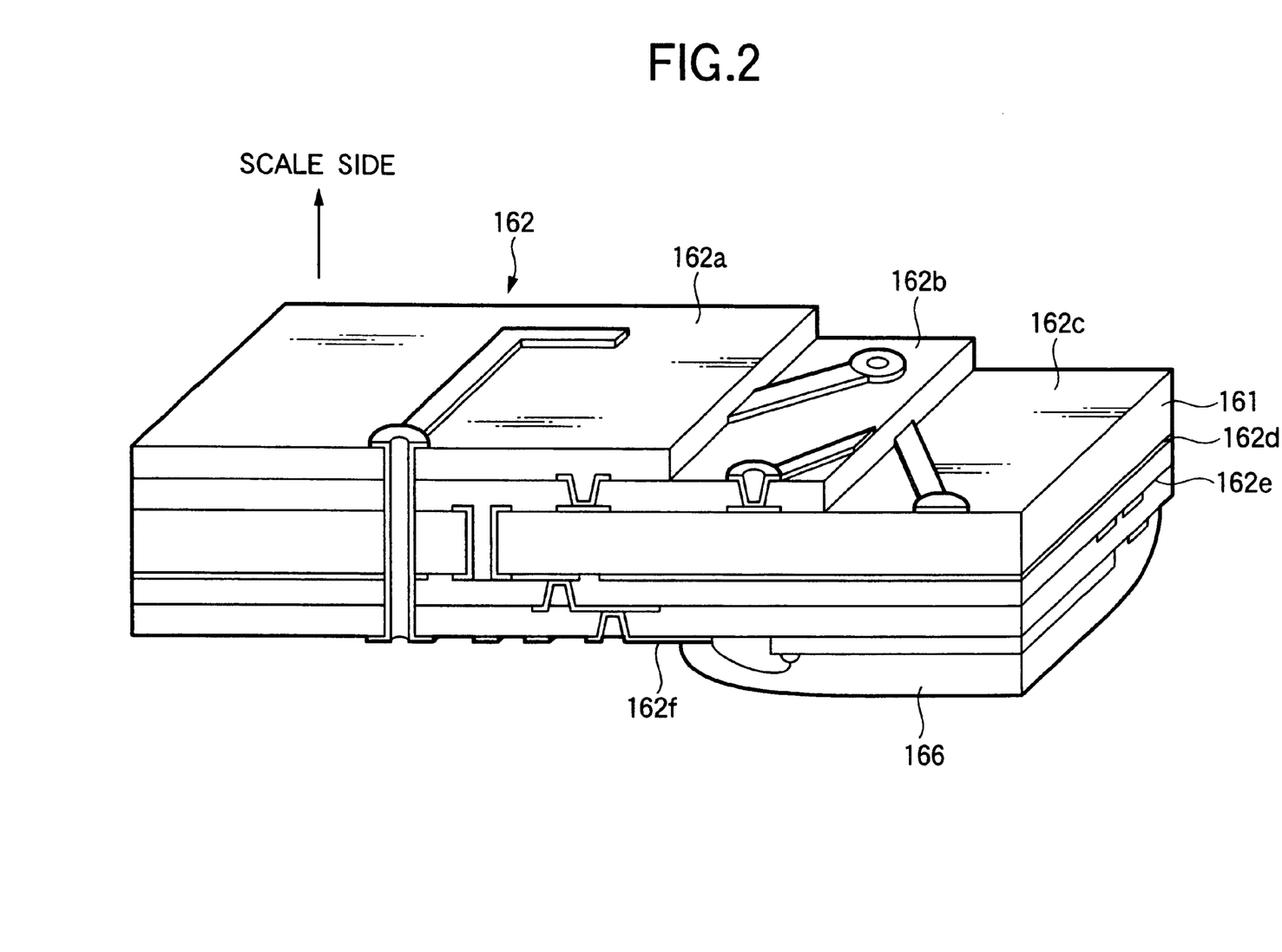
FIG. 2 is a constructional view of the substrate in FIG. 1.

FIG. 2 shows the construction of the substrate 162 FIG. 1. The substrate 162 has a multilayer structure, and in this embodiment, has a 6-layer structure as illustrated. That is, a first layer 162a, a second layer 162b, a third layer 162c, a fourth layer 162d, a fifth layer 162e, and a sixth layer 162f are formed in order from the side facing the scale 104. Such a multilayer structure can be formed by a so-called build-up method in which the layers are laminated in order on both surfaces of core layer 161. A double-sided printed circuit board is used for the core layer, and a through hole may be perforated from the surface to the back surface of the multilayer structure. The members which the substrate 162 should have, that is, the exciting coil, detecting coils, and signal processing IC 166 are formed at any of these layers of the multilayer structure, and in this embodiment, they are formed in the order explained as follows. An exciting coil is formed at the first layer 162a which is closest to the scale 104, that is, at the measuring plane side (or surface side) of the substrate 162, and detecting coils are formed at the second layer 162b and the third layer 162c. Then, a wiring layer is formed at the fifth layer 162e at the opposite side of the scale 104 from the core layer 161, and signal processing IC 166 is formed at the sixth layer 162f, that is, at the opposite side (or the back surface side) of the measuring plane of the substrate 162. In a case where the exciting coil and the signal processing IC are formed in parallel within the same plane, the area increases. However, the exciting coil and signal processing IC are thus formed, respectively, at the surface and the back surface of the substrate 162, whereby a reduction in size is realized.

Furthermore, in this embodiment, a magnetic shield layer is formed at the fourth layer 162d between the exciting coil and the signal processing IC 166. If the exciting coil and the signal processing IC 166 are formed, respectively, at the surface and the back surface of the substrate 162e a change in magnetic flux from the exciting coil may influence the circuit of the signal processing IC and increase electro magnetic noise. However, a magnetic shield layer is thus provided between the exciting coil and the signal processing IC 166, whereby electromagnetic noise occurring in the signal processing IC 166 can be suppressed and the detection accuracy can be improved.

Figure 3A:
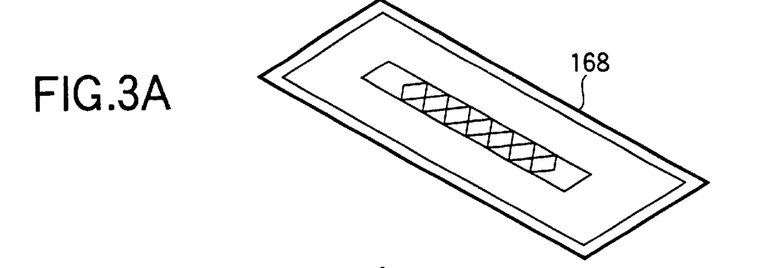
FIGS. 3A–E are respectively exploded explanatory views of the substrate.
Figure 3B:
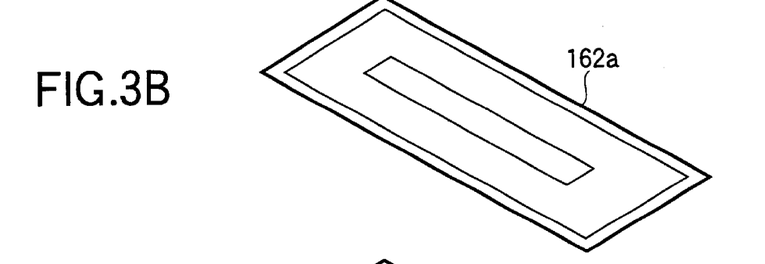
Figure 3C:
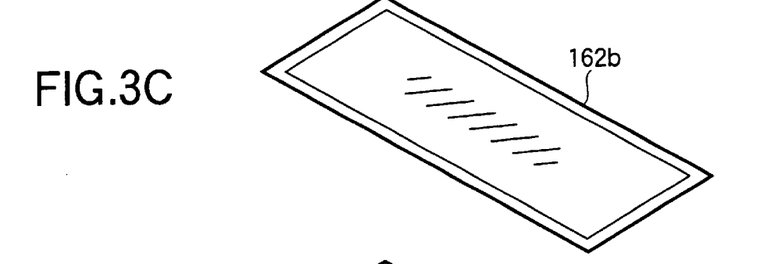
Figure 3D:
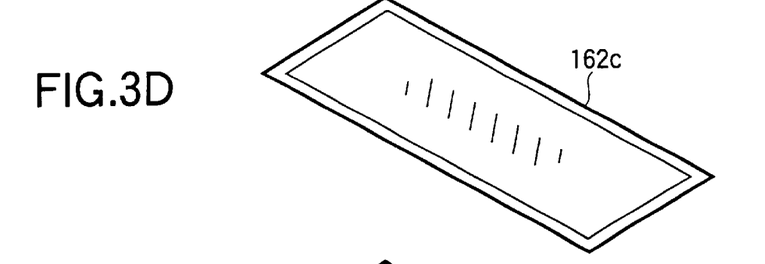
Figure 3E:
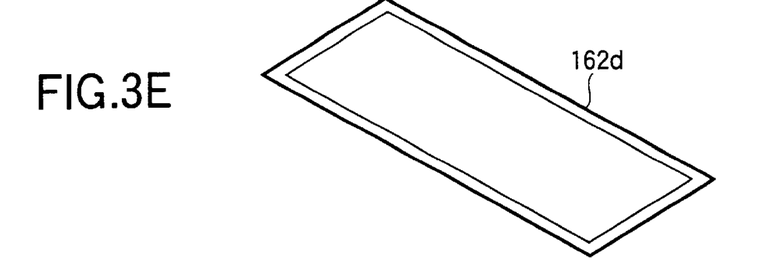

FIGS. 3A–E show respectively exploded views of the multilayer structure shown in FIG. 2. FIG. 3A shows the printed circuit board 168 at the scale 104 side, and FIG. 3B through E show the multilayer structure of the substrate 162 within the grid assembly. FIG. 3B shows the first layer 162a that is closest to the scale 104, at which the exciting coil is formed as mentioned above. FIG. 3C shows the second layer 162b, at which the first detecting coil is formed. FIG. 3D shows the third-layer 162c, at which the second detecting coil is formed. The first detecting coil and the second detecting coil are electrically connected to each other. FIG. 3E shows the fourth layer 162d sandwiching the core layer with the third layer, at which a magnetic shield is formed to insulate magnetic flux from the exciting coil formed at the first layer 162a. The magnetic shield may be formed from copper, ferrite, or permalloy. More generally, the magnetic shield layer may be formed from nonmetals with high magnetic permeability represented by ferrite, metals with low magnetic permeability represented by copper, or metals with high magnetic permeability represented by permalloy.

Herein, it is necessary that the potential of the magnetic shield layer is stabilized to prevent electromagnetic interaction, which does not contribute to the signal from the exciting coil to the detecting coils, from generating through the shield layer. Therefore, it is preferable that the magnetic shield layer is maintained at a constant voltage, for example, at a GND level. Of course, it may be maintained at a power supply voltage Vdd, or other constant potential. Thereby, electromagnetic noise occurring in the signal processing IC 166 can be securely suppressed.

On the other hand, in some cases, the magnetic shield layer of copper or metal may reduce signal magnetic flux generated in the exciting coil due to the generation of an eddy current on the surface. Particularly, the smaller the distance between the exciting coil and the magnetic shield layer, the greater the degree of reduction. The lowering of the magnetic density toward the scale 104 causes the detection signal to lower. Therefore, it is preferable that the distance between the magnetic shield layer and the exciting coil is set to be a predetermined distance or longer. In terms of detection performance, it is preferable that the distance between the magnetic shield layer and the exciting coil is determined in accordance with the distance between the exciting coil and the scale 104, that is, the air gap (it may be referred to as the distance between the grid and the scale).

Figure 4:
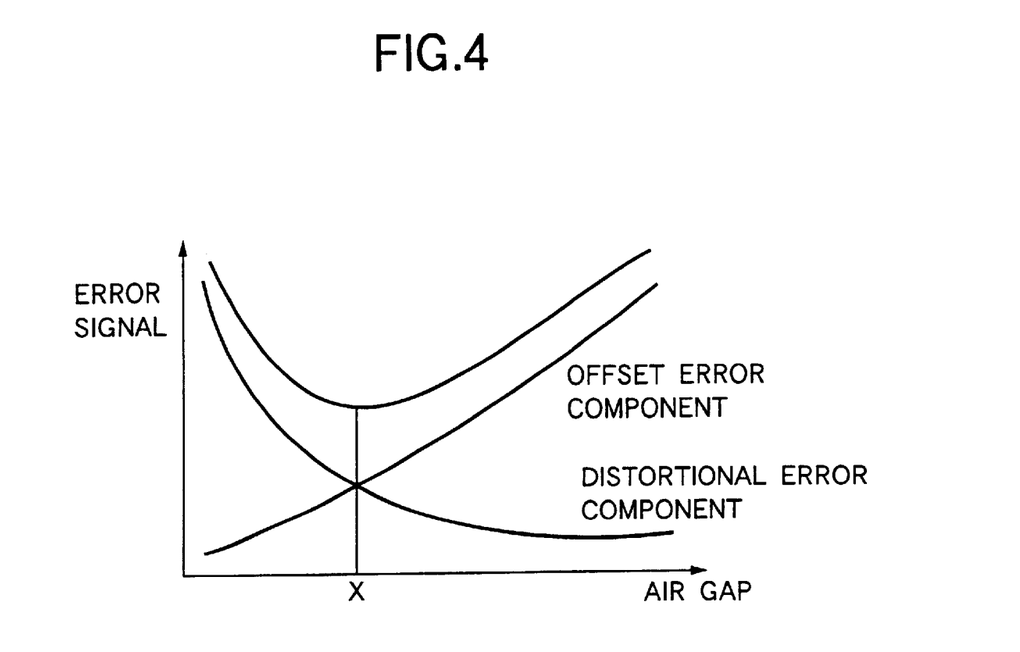
FIG. 4 is a graph showing the relationship between the air gap and the error signal in the embodiment.

Hereinafter, the position of formation of the magnetic shield layer is explained. FIG. 4 shows the relationship between the air gap and the error signal contained in the detection signal. As can be understood from the figure, the offset error component become smaller as the air gap becomes smaller, however, to the contrary, the detection signal moves from a sine waveform close to a triangular waveform. This is because the form (triangular waveform) of the scale coil formed on the circuit board of the scale 104 has a greater influence as the air gap becomes smaller. The amount of deviation from the sine waveform is evaluated as distortion component, and the smaller the air gap, the greater the distortion component. Therefore, the error signal in which the offset error component and the distortion component are added becomes minimum when the air gap is a certain value X. The air gap X by which the error signal becomes minimum is approximately one tenth of the pitch (or wavelength) of the detection signal Therefore, in terms of improvement in the detection accuracy, it is preferable that the air gap is set to be approximately one tenth of the pitch of the detection signal.

Figure 5:
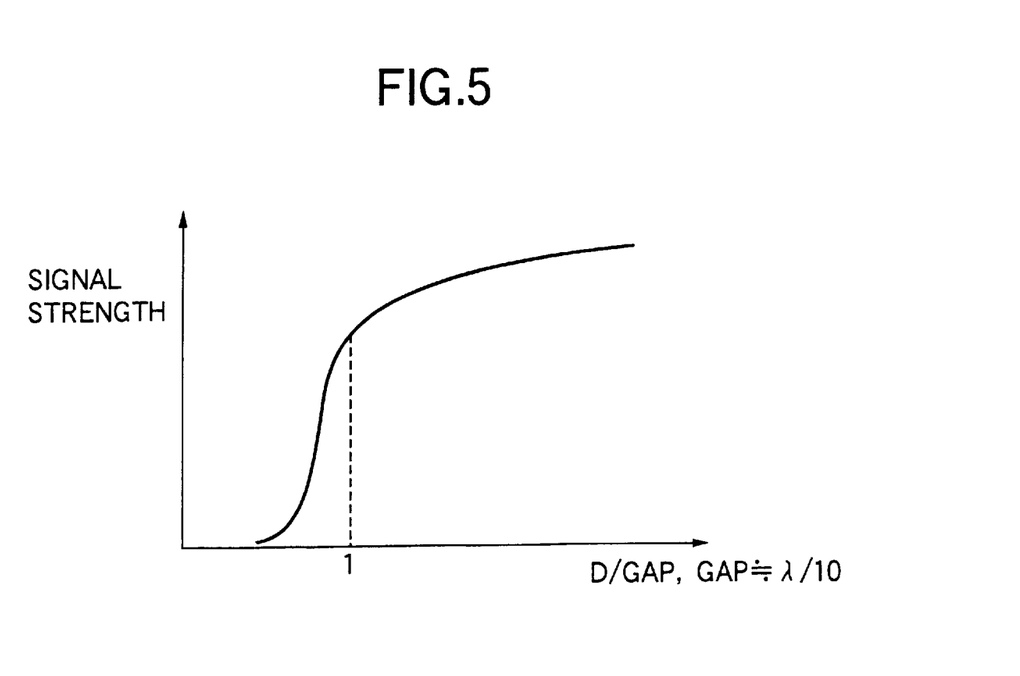
FIG. 5 is a graph showing the relationship between the magnetic shield position and the signal strength in the embodiment.

On the other hand, the change in the signal strength in the case where the air gap is set to this value and the distance d between the exciting coil and the magnetic shield layer is changed is shown in FIG. 5. When the distanced between the exciting coil and the magnetic shield layer becomes smaller than the air gap (gap), and d/gap becomes smaller than 1, the signal strength is suddenly attenuated. It is considered that this phenomenon is caused because the magnetic flux density from the exciting coil is canceled by an eddy current generated in the metallic magnetic shield layer and the magnetic flux density lowers on the scale 104. On the other hand, when the distance d becomes equal to or longer than the air gap and d/gap $\geq 1$, such attenuation in the signal strength does not occur, and sufficient signal strength is obtained.

Thus, it can be understood that when the air gap (the distance between the grid and the scale, or the distance between the exciting coil and the scale is set to approximately one tenth of the detection signal wavelength, and the magnetic shield layer is formed from metal such as copper, the distance d between the exciting coil and the magnetic shield layer is preferably set so that d/gap $\leq 1$.

Furthermore, in a case where a nonmetal with high magnetic permeability such as ferrite is used for the magnetic shield layer, unlike in the case as mentioned above, the magnetic flux density from the exciting coil is not canceled by the eddy current, but is increased on the same principle of a transformer due to the high magnetic permeability of the magnetic shield layer, so that the distance d between the exciting coil and the magnetic shield layer can be set to be smaller. Concretely, d/gap $\leq 1$ can be set. In this case, the induction type transducer can be made thinner.

Thus, in this embodiment, the substrate 162 within the grid is constructed so as to have a multilayer structure, and the exciting coil, detecting coils, and signal processing IC are formed at the respective layers of the multilayer structure, whereby the substrate 162 can be made smaller in size, and the entirety of the grid can be made smaller in size.

Furthermore, in the multilayer structure, the exciting coil is formed at the scale side and the signal processing IC is formed at the opposite side of the scale, whereby the magnetic flux generated in the exciting coil can be efficiently induced in the scale.

Furthermore, the magnetic shield layer, which is maintained at a constant voltage, is provided between the exciting coil and the signal processing IC in the multilayer structure, whereby the generation of electro magnetic noise in the signal processing IC due to the change in the magnetic flux from the exciting coil can be efficiently suppressed.

In the present embodiment, the magnetic shield layer is formed at the fourth layer 162*d*, however, the shield layer may be formed at other layers as necessary so that the plurality of magnetic shield layers insulate the magnetic flux from the exciting coil.

Furthermore, in the present embodiment, the exciting coil, detecting coils, and signal processing IC are formed in order from the side close to the scale 104, however, the exciting coil and the detecting coils may be formed at the same layer. A formation of the detecting coils, exciting coil, and signal processing IC in order from the side closer to the scale 104 is also possible. In order to obtain the stronger signal, it is preferable that the exciting coil is formed at a distance from the scale 104 that is the same as or shorter than that of the detecting coils. The detecting coils and the signal processing IC cat be formed at the same layer. Since it is necessary that the signal processing IC is separated by a predetermined distance or longer from the exciting coil, and the detecting coils must be formed at a position close to the scale 104 to detect the induced magnetic flux of the scale coil, the detecting coils are preferably formed at a distance from the scale 104 that is shorter than that of the signal processing IC 166. As a result, it is desirable that the exciting coil, detecting coils, magnetic shield layer, and signal processing IC are formed in order from the side close to the scale 104.

In the present embodiment of the invention, a case where the induction type transducer is applied to an electronic caliper is explained as mentioned above, however, the transducer can be applied to measuring equipment other than the caliper.

According to the invention, an induction type transducer which is small in size and excellent in detection accuracy can be obtained, and by installing this induction type transducer into an electronic caliper, a caliper is obtained, which is small in size, excellent in environmental resistance, and has high detection accuracy.

What is claimed is:

1. An induction type tranducer outputting an electric signal in accordance with relative displacement between two members, comprising:

a magnetic flux generating section for generating a magnetic flux based on a drive signal;

a magnetic flux detecting section for detecting the magnetic flux which changes in accordance with the relative displacement, wherein the magnetic flux detecting section has first and second series of linear parallel conductors connected to each other;

a signal processing section for processing a detection signal from the magnetic flux detecting section; and a magnetic shield section between the magnetic flux generating section and the signal processing section;

wherein the magnetic flux generating section, the magnetic flux detecting section, the signal processing section, and the magnetic shield section are formed at a substrate with a multilayer structure, wherein the substrate has the multilayer structure obtained by building-up a plurality of layers on a core layer with a gap between the magnetic flux generating section and a scale and with a distance between the magnetic flux generating section and the magnetic shield section, and wherein the distance is at least equal to the gap for the magnetic shield section having low magnetic permeability and the gap is at least equal to the distance for the magnetic shield section having high magnetic permeability.

2. The induction type transducer as set forth in claim 1, wherein the magnetic flux generating section is formed at a measuring plane side of the substrate, and the signal processing section is formed at an opposite side of the measuring plane of the substrate.

3. The induction type transducer as set forth in claim 2, wherein the magnetic flux detecting section are formed at the measuring plane side of the substrate.

4. The induction type transducer as set forth in claim 1, wherein, in the multilayer structure, the magnetic flux generating section is formed at a layer closer to the measuring plane than the signal processing section.

5. The induction type transducer as set forth in claim 4, wherein, in the multilayer structure, the magnetic flux detecting section is formed at a layer closer to the measuring plane than the signal processing sections.

6. The induction type transducer as set forth in claim 5, wherein, in the multilayer structure, the magnetic flux generating section is formed at a layer closer to the measuring plane than the magnetic flux detecting section.

7. The induction type transducer as set forth in claim 5, wherein, in the multilayer structure, the magnetic flux detecting section is formed at a layer closer to the measuring plane than the magnetic flux generating section.

8. The induction type transducer as set forth in claim 5, wherein, in the multilayer structure, the magnetic flux detecting section is formed at the same layer as the magnetic flux generating section.

9. The induction type tranducer as set forth in claim 1, wherein the magnetic shield section is formed from at least any one of nonmetals with high magnetic permeability, metals with low magnetic permeability, and metals with high magnetic permeability.

10. The induction type transducer as set forth in claim 9, where in the nonmetal with high magnetic permeability includes a ferrite.

11. The induction type transducer as set forth in claim 9, wherein the metal with low magnetic permeability includes a copper.

12. The induction type transducer as set forth in claim 9, wherein the metal with high magnetic permeability includes a permalloy.

13. The induction type tranducer as set forth in claim 1, wherein the magnetic shield section is maintained to be at a constant voltage.

14. The induction type tranducer as set forth in claim 1, wherein in the case where a material of the magnetic shield section is metal, the magnetic shield section is formed so as to be separated from the magnetic flux generating section by a distance equivalent to or longer than a gap between the two members.

15. The induction type tranducer as set forth in claim 1, wherein in the case where a material of the magnetic shield section is nonmetal, the magnetic shield section is formed at a close distance from the magnetic flux generating section that is equivalent to or longer than a gap between the two members.

16. The induction type transducer as set forth in claim 1, formed on a first member of the two members, wherein a gap between the induction type transducer and a second of the two members set to be approximately one tenth of a pitch of the detection signal.

17. The electronic caliper comprising an induction type tranducer for outputting an electric signal in accordance with relative displacement between a scale and a grid, the induction type tranducer including:

a magnetic flux generating section for generating a magnetic flux based on a drive signal;

a magnetic flux detecting section for detecting the magnetic flux which changes in accordance with the relative displacement, wherein the magnetic flux detecting section has first and second series of linear parallel conductors connected to each other;

a signal processing section for processing a detection signal from the magnetic flux detecting section; and a magnetic shield section between the magnetic flux generating section and the signal processing section;

wherein the magnetic flux generating section, the magnetic flux detecting section, the signal processing section, and the magnetic shield section are formed at a substrate with a multilayer structure, wherein the substrate has the multilayer structure obtained by building-up a plurality of layers on a core layer with a gap between the magnetic flux generating section and a scale and with a distance between the magnetic flux generating section and the magnetic shield section, and wherein the distance is at least equal to the gap for the magnetic shield section having low magnetic permeability and the gap is at least equal to the distance for the magnetic shield section having high magnetic permeability.

18. The electronic caliper as set forth in claim 17, wherein a gap between the scale and the induction type transducer is set to be approximately one tenth of a pitch of the detection signal.

19. The electronic caliper as set forth in claim 17, wherein the magnetic flux generating section is formed at a measuring plane side of the substrate, and the signal processing section is formed at an opposite side of the measuring plane of the substrate.

20. The induction type transducer as set forth in claim 17, wherein, in the multilayer structure, the magnetic flux generating section is formed at a layer closer to the measuring plane than the signal processing section.

* * * * *